(12) United States Patent
Chou

(10) Patent No.: US 8,014,500 B2
(45) Date of Patent: Sep. 6, 2011

(54) METHODS AND SYSTEMS FOR SCREENING INCOMING CALLS

(75) Inventor: Fu-Chiang Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1064 days.

(21) Appl. No.: 11/882,947

(22) Filed: Aug. 7, 2007

(65) Prior Publication Data

US 2008/0144782 A1 Jun. 19, 2008

(30) Foreign Application Priority Data

Dec. 13, 2006 (TW) .............................. 95146593 A

(51) Int. Cl.
*H04M 15/06* (2006.01)
(52) U.S. Cl. .................. 379/88.19; 379/142.06
(58) Field of Classification Search ............... 379/88.19, 379/88.02, 142.06
See application file for complete search history.

(56) References Cited

U.S. PATENT DOCUMENTS

| 2002/0168063 | A1* | 11/2002 | Williams ................. 379/374.02 |
| 2006/0182029 | A1* | 8/2006 | Kealy et al. .................... 370/230 |
| 2007/0127635 | A1* | 6/2007 | Zellner et al. ................. 379/67.1 |
| 2008/0107244 | A1* | 5/2008 | Setzer et al. ................ 379/88.12 |
| 2009/0214007 | A1* | 8/2009 | Van Wyk et al. ........... 379/88.19 |

FOREIGN PATENT DOCUMENTS

TW M298291 9/2006

* cited by examiner

*Primary Examiner* — Creighton Smith
(74) *Attorney, Agent, or Firm* — Birch, Stewart, Kolasch & Birch, LLP

(57) ABSTRACT

Methods and systems for screening incoming calls for use in a device having telecommunication capability. An incoming call from a caller is received. In response to the incoming call, a prompt is generated to the caller, and a response corresponding to the prompt is received therefrom. It is determined whether the response conforms to a specific answer. If so, the device indicates the reception of the incoming call. The prompt and response may be voice and/or text.

27 Claims, 4 Drawing Sheets

METHODS AND SYSTEMS FOR SCREENING INCOMING CALLS

BACKGROUND OF THE INVENTION

1. Field of the Invention

The disclosure relates generally to call management, and, more particularly to methods and systems for screening incoming calls.

2. Description of the Related Art

Phone users are frequently bothered by telemarketers, scam artists, prank callers, wrong numbers, and others. These calls may be indecent, menacing, and/or irritating, increasing probability for phone users posing in a financial risk. To the vast majority of call recipients, these unwanted calls are viewed as a nuisance and an invasion of personal privacy.

Currently, some phones provide mechanisms for screening incoming calls. Users can edit a blacklist recording caller ID, such as name or phone number. If an incoming call from the caller recorded in the blacklist is received, the incoming call is rejected or redirected to a voice box. In the conventional mechanism, however, users must know the name or phone number of the caller, and then enter it into the blacklist. The conventional screening mechanism only works on known callers, and is useless for calls from unknown callers, such as telemarketers, scam artists, prank callers, wrong numbers, and others. Additionally, if all calls with unknown names or phone numbers are set to reject, some important calls may be lost. The conventional mechanism has limited effectiveness for screening incoming calls, and lacks flexibility in practice.

BRIEF SUMMARY OF THE INVENTION

Methods and systems for screening incoming calls are provided.

In an embodiment of a method for screening incoming calls for use in a device having telecommunication capability, an incoming call is received. In response to the incoming call, a prompt is generated to the caller, and a response corresponding to the prompt is received therefrom. It is determined whether the response conforms to a specific answer. If so, the device indicates reception of the incoming call.

An embodiment of a system for screening incoming calls comprises a processing unit. The processing unit receives an incoming call and generates a prompt to the caller in response. The processing unit receives a response corresponding to the prompt from the caller, and determines whether the response conforms to a specific answer. If so, the processing unit indicates the reception of the incoming call.

Methods and systems for screening incoming calls may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for screening incoming calls are provided.

Figure 1:
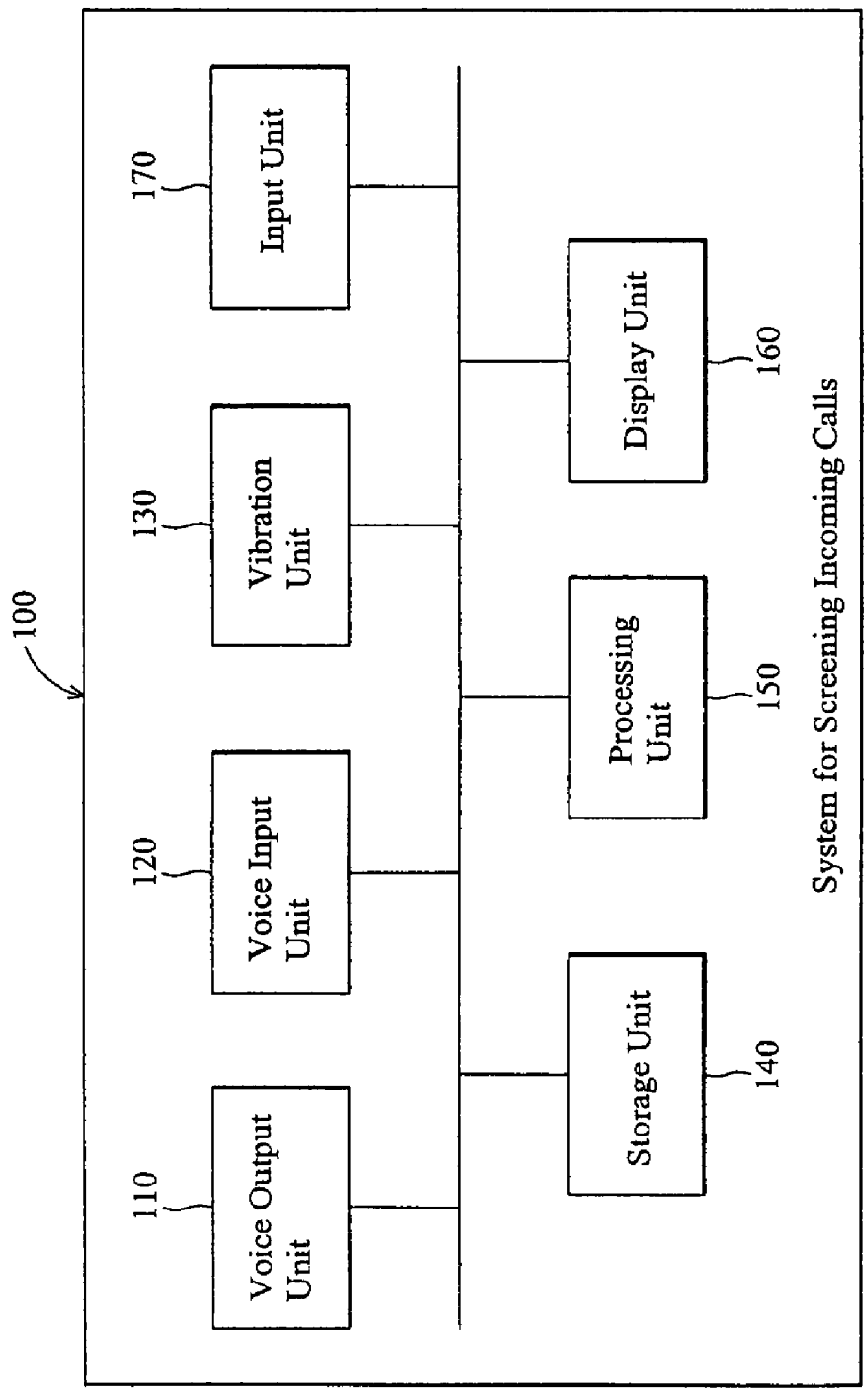
FIG. 1 is a schematic diagram illustrating an embodiment of a system for screening incoming calls.

FIG. 1 is a schematic diagram illustrating an embodiment of a system for screening incoming calls.

The system 100 may be a device having telecommunication capability, such as a fixed phone or a mobile phone. The system 100 comprises a voice output unit 110, a voice input unit 120, a vibration unit 130, a storage unit 140, a processing unit 150, a display unit 160, and an input unit 170. The voice output unit 110 may be an earphone or a speaker. The voice input unit 120 may be a microphone. The vibration unit 130 may cause vibration on the device. The storage unit 140 may be a built-in memory, or external memory card. The storage unit 140 may comprise a blacklist, an address book, and a calling history list comprising dialed calls, answered calls, and/or missed calls. The processing unit 150 controls operations of components of the system 100, and performs the method for screening incoming calls. The display unit 160 may be a screen of the device displaying related information. The input unit 170 may be a keypad or touch sensitive mechanism receiving inputs from users.

Figure 2:
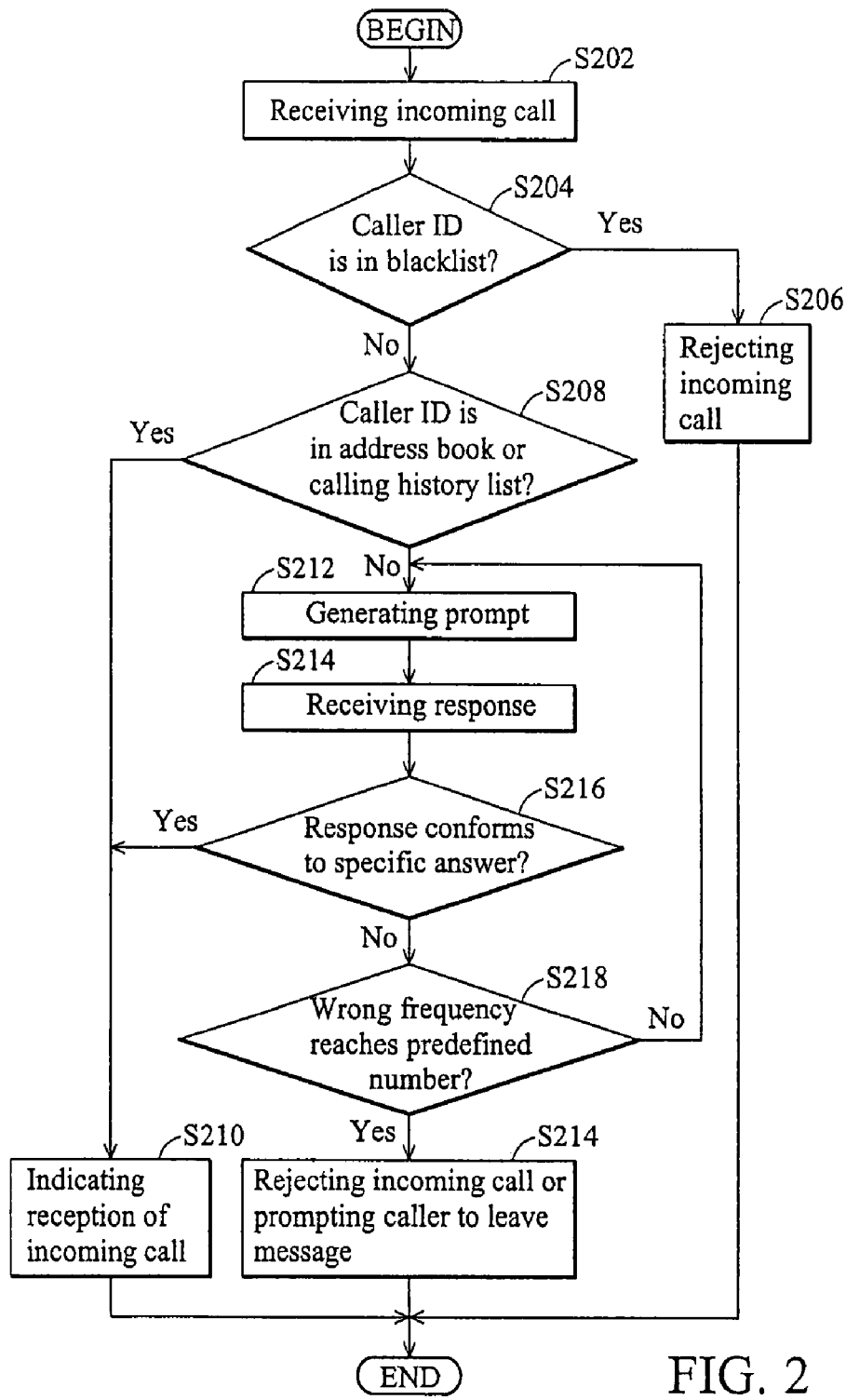
FIG. 2 is a flowchart of an embodiment of a method for screening incoming calls.

FIG. 2 is a flowchart of an embodiment of a method for screening incoming calls for use in a device having telecommunication capability.

In step S202, an incoming call from a caller is received. In step S204, it is determined whether the caller ID, such as name or phone number is in the blacklist. If so (Yes in step S204), in step S206, the incoming call is rejected. If not (No in step S204), in step S208, it is determined whether the caller ID is in the address book or the calling history list. If so (Yes in step S208), in step S210, the device is directly driven to indicate the reception of the incoming call using a specific manner. The manner may comprise vibration of the vibration unit 130, text or images displayed via the display unit 160, and/or ringing via the voice output unit 110. After being apprised of the reception of the incoming call, the phone user can use an input unit (not shown) of the system 100 to select and perform a specific process such as answering the incoming call, muting the incoming call, redirecting the incoming call to a voice box, or rejecting the incoming call.

If not (No in step S208), in step S212, a prompt is generated to the caller. In step S214, a response corresponding to the prompt is received from the caller, and in step S216, it is determined whether the response conforms to a specific answer. It is understood that the prompt and the answer may have various manners and combinations. For example, the prompt may comprise a voice or text message, and the response may be a voice (with video) or keystroke input. In some embodiments, the prompt and the answer can be recorded in the processing unit 150, for example, in the specific program codes, or in the storage unit 140. If the response conforms to the specific answer (Yes in step S216), in step S210, the device is directly driven to indicate the reception of the incoming call. If the response does not conform to the specific answer (No in step S216), in step S218, it is determined whether the wrong frequency of response reaches a predefined number. If not (No in step S218), the procedure returns to step S212. If so (Yes in step S218), in step S220, the incoming call is rejected or prompted to leave a message.

Figure 3:
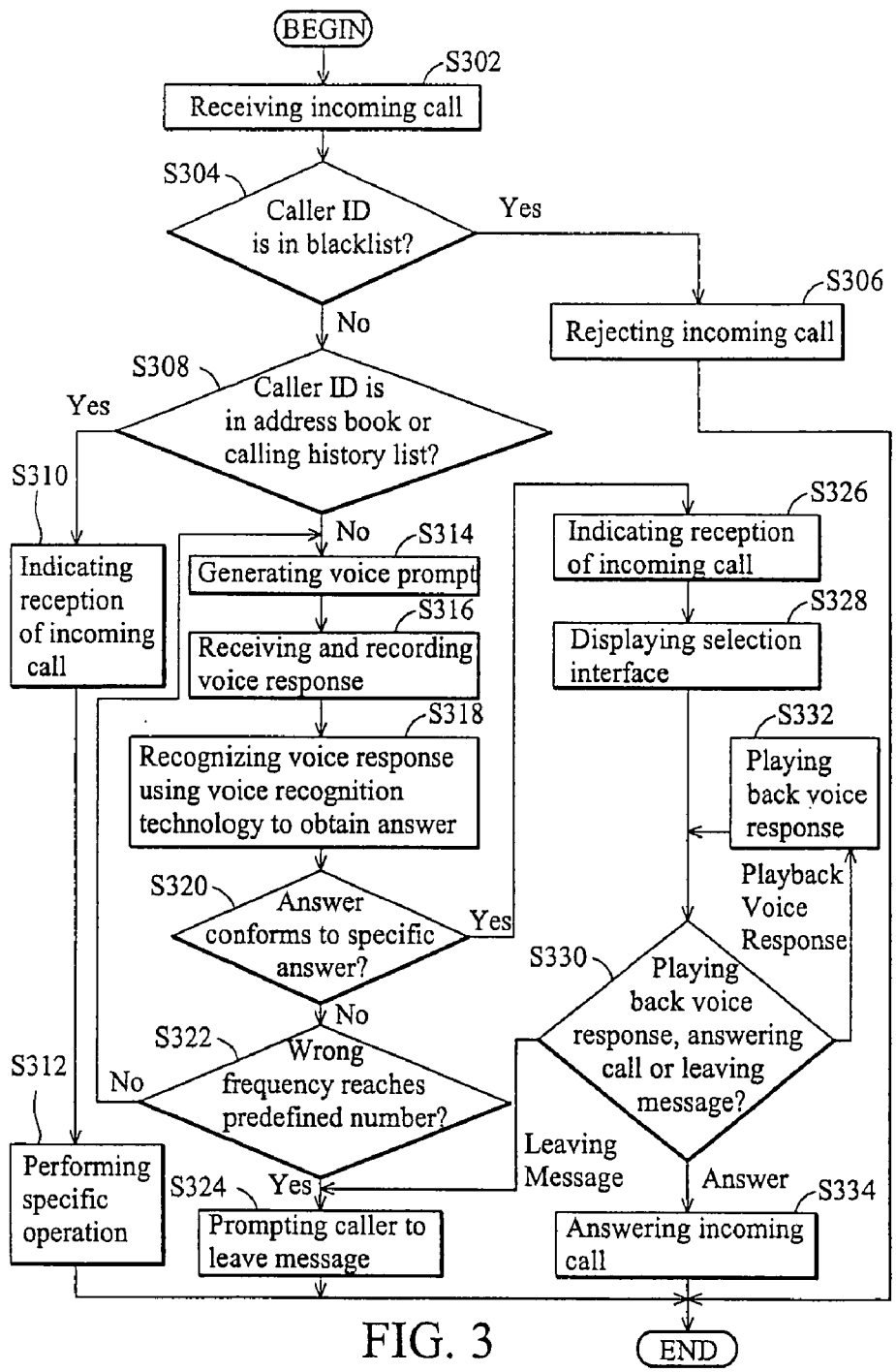
FIG. 3 is a flowchart of an embodiment of a method for screening incoming calls.

FIG. 3 is a flowchart of an embodiment of a method for screening incoming calls. In this embodiment, a voice recognition technology is employed to recognize the response of a caller.

In step S302, an incoming call from a caller is received. In step S304, it is determined whether the caller ID, such as name or phone number, is in the blacklist. If so (Yes in step S304), in step S306, the incoming call is rejected. If not (No in step S304), in step S308, it is determined whether the caller ID is in the address book or the calling history list. If so (Yes in step S308), in step S310, the device is directly driven to indicate the reception of the incoming call using a specific manner. The manner may comprise vibration of the vibration unit 130, text or images displayed by the display unit 160, and/or ringing via the voice output unit 110. After being apprised of the reception of the incoming call, in step S312, the phone user can use an input unit of the system 100 to select and perform a specific process such as answering the incoming call, muting the incoming call, redirecting the incoming call to a voice box, or rejecting the incoming call.

If not (No in step S308), in step S314, a prompt such as "please provide the full name of the called party" or a specific question is generated to the caller. In step S316, a voice response corresponding to the voice prompt is received and recorded from the caller, and in step S318, the voice response is recognized using a voice recognition technology to obtain an answer corresponding to the voice response. In step S320, it is determined whether the answer corresponding to the voice response conforms to a specific answer. If not (No in step S320), in step S322, it is determined whether the wrong frequency of answer reaches a predefined number such as 2. If not (No in step S322), the procedure returns to step S314. If so (Yes in step S322), in step S324, the caller is prompted to leave a message for the incoming call. If the answer corresponding to the voice response conforms to the specific answer (Yes in step S320), in step S326, the device is directly driven to indicate the reception of the incoming call using a specific manner, and in step S328, a selection interface is displayed via the display unit 160. A subsequent process such as playing back the recorded voice response, answering the incoming call or prompting the caller to leave a message can be selected via the selection interface. In step S330, it is determined whether the subsequent process is playing back the recorded voice response, answering the incoming call or prompting the caller to leave a message. If the subsequent process is playing back the recorded voice response, in step S332, the recorded voice response is played back via the voice output unit 110, and the procedure returns to step S330. If the subsequent process is prompting the caller to leave a message, in step S324, the caller is prompted to leave a message. If the subsequent process is answering the incoming call, in step S334, the incoming call is answered. It is understood that, in some embodiments, when the caller hears the voice prompt, the caller can generate a keystroke input for the response, and transmit the keystroke input to the called party. The processing unit 150 can determine whether the keystroke input conforms to the specific answer, and perform subsequent operations.

Figure 4:
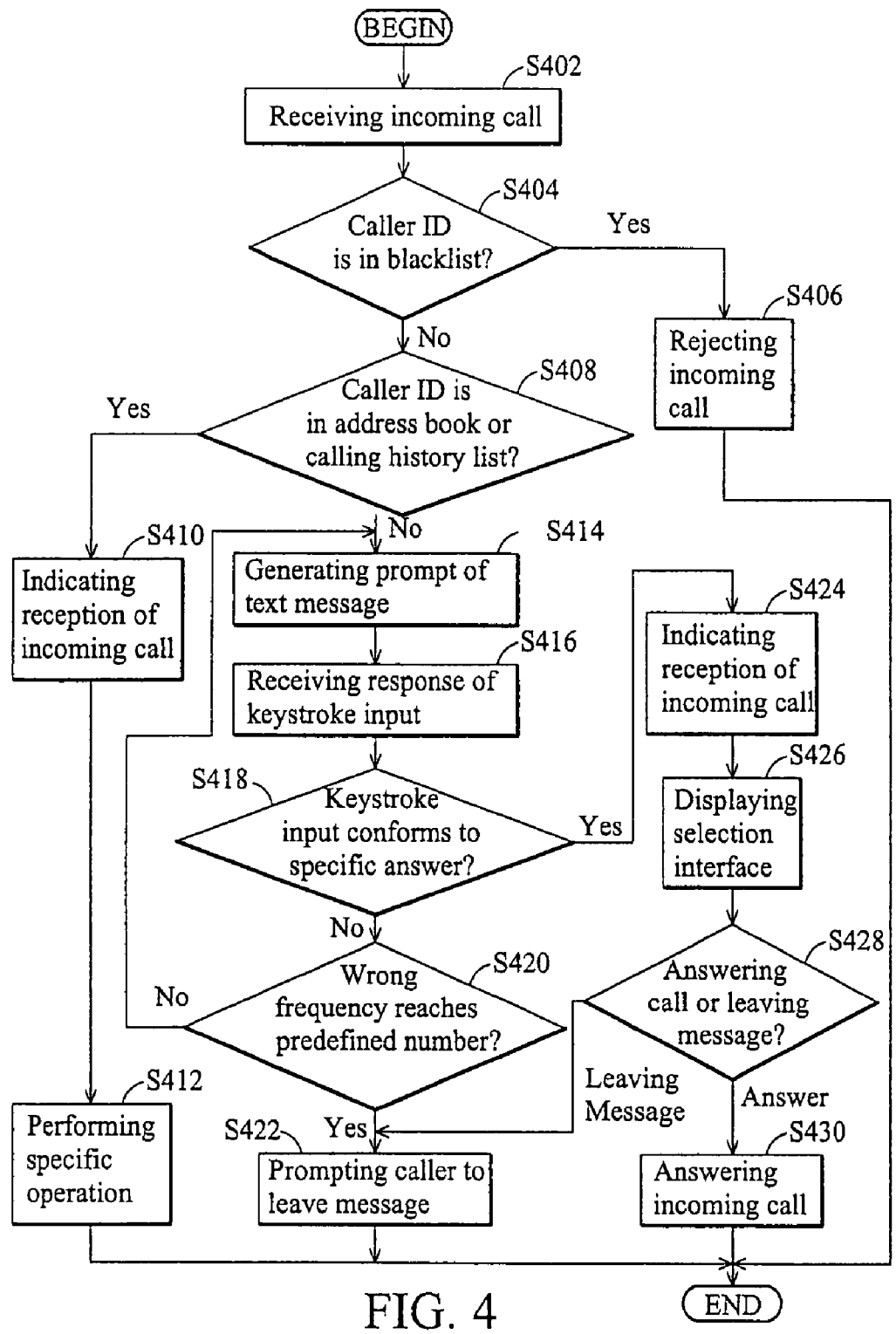
FIG. 4 is a flowchart of an embodiment of a method for screening incoming calls.

FIG. 4 is a flowchart of an embodiment of a method for screening incoming calls. In this embodiment, the prompt and response may be a text message and a keystroke input.

In step S402, an incoming call from a caller is received. In step S404, it is determined whether the caller ID, such as name or phone number is in the blacklist. If so (Yes in step S404), in step S406, the incoming call is rejected. If not (No in step S404), in step S408, it is determined whether the caller ID is in the address book or the calling history list. If so (Yes in step S408), in step S410, the device is directly driven to indicate the reception of the incoming call using a specific manner. The manner may comprise vibration of the vibration unit 130, text or images displayed by the display unit 160, and/or ringing via the voice output unit 110. After being apprised of the reception of the incoming call, in step S412, the phone user can use an input unit (not shown) of the system 100 to select and perform a specific process such as answering the incoming call, muting the incoming call, redirecting the incoming call to a voice box, or rejecting the incoming call.

If not (No in step S408), in step S414, a prompt of text message is generated to the caller. In step S416, a response of keystroke input corresponding to the prompted text message is received from the caller. In step S418, it is determined whether the keystroke input conforms to a specific answer. If not (No in step S418), in step S420, it is determined whether the wrong frequency of keystroke input reaches a predefined number such as 2. If not (No in step S420), the procedure returns to step S414. If so (Yes in step S420), in step S422, the caller is prompted to leave a message for the incoming call. If the keystroke input conforms to the specific answer (Yes in step S418), in step S424, the device is directly driven to indicate the reception of the incoming call using a specific manner, and in step S426, a selection interface is displayed via the display unit 160. A subsequent process such as answering the incoming call or prompting the caller to leave a message can be selected via the selection interface. In step S428, it is determined whether the subsequent process is answering the incoming call or prompting the caller to leave a message. If the subsequent process is prompting the caller to leave a message, in step S422, the caller is prompted to leave a message. If the subsequent process is answering the incoming call, in step S430, the incoming call is answered.

In the invention, incoming calls can be screened via prompts and responses in voice and/or text means, reducing undesired calls.

Methods and systems for screening incoming calls, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A method for screening incoming calls for use in a device having telecommunication capability, comprising:

receiving an incoming call from a caller;

generating a prompt to the caller in response to the incoming call;
receiving a response corresponding to the prompt from the caller;
determining whether the response conforms to a specific answer;
if so, driving the device to indicate the reception of the incoming call; and
if the response does not conform to the specific answer, re-generating the prompt to the caller, re-receiving a response corresponding to the prompt from the caller, and determining whether the response conforms to the specific answer.

2. The method of claim 1 further comprising generating the prompt by generating a first voice or a text message to the caller.

3. The method of claim 1 further comprising receiving the response corresponding to the prompt by receiving a second voice from the caller.

4. The method of claim 3 further comprising:
recognizing the second voice using a voice recognition technology to obtain an answer corresponding to the second voice; and
determining whether the answer conforms to the specific answer.

5. The method of claim 4 further comprising recording the second voice.

6. The method of claim 5 further comprising providing an interface for selecting playback of the second voice if the answer conforms to the specific answer.

7. The method of claim 1 further comprising providing an interface prompting the caller to leave a message if the response conforms to the specific answer.

8. The method of claim 1 further comprising receiving the response corresponding to the prompt by receiving a keystroke input from the caller.

9. The method of claim 8 further comprising determining whether the keystroke input conforms to the specific answer.

10. The method of claim 1 further comprising vibrating the device, displaying text or images, or ringing to indicate the reception of the incoming call.

11. The method of claim 1, further comprising rejecting the incoming call or prompting the caller to leave a message if the wrong frequency of the response reaches a predefined number.

12. The method of claim 1 further comprising:
determining whether a caller ID of the incoming call is in a blacklist; and
if so, rejecting the incoming call.

13. The method of claim 1 further comprising:
determining whether a caller ID of the incoming call is in an address book or a calling history list; and
if so, directly driving the device to indicate the reception of the incoming call.

14. A system for screening incoming calls, comprising a processing unit receiving an incoming call from a caller, generating a prompt to the caller in response to the incoming call, receiving a response corresponding to the prompt from the caller, determining whether the response conforms to a specific answer, if so, driving the device to indicate the reception of the incoming call using a manner, and if the response does not conform to the specific answer, re-generating the prompt to the caller, re-receiving a response corresponding to the prompt from the caller, and determining whether the response conforms to the specific answer.

15. The system of claim 14 wherein the processing unit further generates the prompt by generating a first voice or a text message to the caller.

16. The system of claim 14 wherein the response corresponding to the prompt comprises a second voice.

17. The system of claim 16 wherein the processing unit further recognizes the second voice using a voice recognition technology to obtain an answer corresponding to the second voice, and determines whether the answer conforms to the specific answer.

18. The system of claim 17 wherein the processing unit further records the second voice.

19. The system of claim 18 further comprising a voice output unit, and the processing unit further provides an interface for selecting playback of the second voice via the voice output unit if the answer conforms to the specific answer.

20. The system of claim 14 wherein the processing unit further provides an interface prompting the caller to leave a message if the response conforms to the specific answer.

21. The system of claim 14 wherein the response corresponding to the prompt comprises a keystroke input.

22. The system of claim 21 wherein the processing unit further determines whether the keystroke input conforms to the specific answer.

23. The system of claim 14 wherein the processing unit further indicates the reception of the incoming call by vibration, displaying text or images, or ringing.

24. The system of claim 14, wherein the processing unit further rejects the incoming call or prompts the caller to leave a message if the wrong frequency of the response reaches a predefined number.

25. The system of claim 14 wherein the processing unit further determines whether a caller ID of the incoming call is in a blacklist, and if so, rejects the incoming call.

26. The system of claim 14 wherein the processing unit further determines whether a caller ID of the incoming call is in an address book or a calling history list, and if so, directly drives the device to indicate the reception of the incoming call.

27. A machine-readable storage medium comprising a computer program, which, when executed, causes a device to perform a method for screening incoming calls, the method comprising:
receiving an incoming call from a caller;
generating a prompt to the caller in response to the incoming call;
receiving a response corresponding to the prompt from the caller;
determining whether the response conforms to a specific answer;
if so, driving the device to indicate the reception of the incoming call, and
if the response does not conform to the specific answer, re-generating the prompt to the caller, re-receiving a response corresponding to the prompt from the caller, and determining whether the response conforms to the specific answer.

* * * * *